(12) United States Patent
Haerr et al.

(10) Patent No.: US 6,626,080 B2
(45) Date of Patent: Sep. 30, 2003

(54) TRIPLE POWER BOOSTER FOR BRAKE SYSTEMS

(75) Inventors: Timothy A. Haerr, Enon, OH (US); Gary C. Fulks, Spring Valley, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/924,142

(22) Filed: Aug. 7, 2001

(65) Prior Publication Data

US 2003/0029311 A1 Feb. 13, 2003

(51) Int. Cl.[7] ................................................. F01B 15/00
(52) U.S. Cl. .......................................... 91/376 R; 92/48
(58) Field of Search ........................... 91/376 R; 92/48, 92/49

(56) References Cited

U.S. PATENT DOCUMENTS

| | | | |
|---|---|---|---|
| 4,729,289 A | * | 3/1988 | Boehm ..................... 91/376 R |
| 4,976,188 A | * | 12/1990 | Suzuki et al. ............. 91/376 R |
| 4,984,507 A | | 1/1991 | Suzuki et al. ............. 91/376 R |
| 5,178,054 A | * | 1/1993 | Shinohara et al. ........ 91/376 R |
| 5,704,270 A | | 1/1998 | Tsubouchi ................. 91/376 R |

* cited by examiner

Primary Examiner—F. Daniel Lopez
(74) Attorney, Agent, or Firm—Scott A. McBain

(57) ABSTRACT

A power booster for a brake system including a housing having an interior and a pair of diaphragms separating the interior of the housing into three chambers. A power piston assembly is coupled for movement with the diaphragms and includes an output member. A reaction member is coupled to the power piston assembly, and an input member is adapted to be coupled to a movable brake pedal. An air valve assembly moves between open and closed positions to selectively admit atmospheric air into selected ones of the chambers. This induces an output force on the diaphragm that is transferred to the output member of the power piston assembly. The triple booster adds an additional working chamber with an added approximately 45% increase in power boost. The triple power booster retains many of the same components as prior dual or tandem boosters to provide an economical solution to increase booster output without the need for new tuning procedures or added booster diameter.

19 Claims, 3 Drawing Sheets

TRIPLE POWER BOOSTER FOR BRAKE SYSTEMS

FIELD OF THE INVENTION

The present invention generally relates to power boosters for brake systems, such as those used in automobiles, for intensifying the input force between a brake pedal and a master cylinder.

BACKGROUND OF THE INVENTION

Brake power boosters generally utilize fluid pressure, or differentials thereof, to provide a power assist in applying force to the master cylinder of the brake system. Upon application of an input force on the brake pedal, an input member such as a pushrod activates the power booster. The power booster intensifies the force by a calibrated amount and transfers the force to a power piston which then moves the master cylinder to apply the brakes at each wheel.

In conventional power boosters, an air valve assembly is opened upon depression of the brake pedal by the operator to admit atmospheric air to at least a first chamber of the power booster housing. This creates a pressure differential across a diaphragm separating the first chamber from a second chamber of the housing. The diaphragm is coupled to the power piston and transmits a force resulting from the pressure differential to the power piston and, ultimately, to the master cylinder.

The force generated by the power booster is a function in large part to the volume of the working chambers of the power booster housing. As a result, the use of vacuum boosters of this type have been limited by physical space constraints, particularly with respect to the booster diameter. Larger and/or heavier vehicles such as trucks and the like require substantially more output force to adequately stop the vehicle. Known vacuum boosters have not been able to deliver the required output force within the available physical size constraints. Therefore, typically a hydraulic booster is employed in larger and/or heavier vehicles to produce sufficient output force to adequately stop such vehicles.

For these general reasons, it would be desirable to provide a vacuum power booster that delivers a high output force to the master cylinder for larger and/or heavier vehicles such as trucks and the like without exceeding the physical space constraints that are available, particularly with respect to booster diameter. Moreover, due to the relatively large number of parts required for a typical power booster and the wide range and styles of automobiles utilizing such systems, the inventory, assembly, repair and related requirements place significant demands on the brake system manufacturer and repair technician. Therefore, it would be highly desirable to provide such a power booster without significantly adding to the inventory, assembly and service demands of such a system.

SUMMARY OF THE INVENTION

The present invention generally provides a vacuum power booster for a brake system with an air valve assembly having the ability to deliver a high output force within limited available space. The present invention could be used for vehicles where a larger vacuum booster is needed, but there is a constraint on booster diameter. Furthermore, the invention offers these advantages while minimizing the number of unique parts and assembly or service demands.

In one embodiment, this invention is a triple vacuum booster in which an additional working chamber is added to known dual chamber vacuum booster. The invention increases output force by approximately 45% over known vacuum boosters having a comparable booster diameter. The present invention utilizes many of the same components of known tandem boosters and as such provides a very economical solution to increase booster output without adding significantly to production costs, inventories and support requirements.

Generally, the power booster of this invention includes a housing having an interior and a number of diaphragms and associated plates separating the interior of the housing into at least three chambers. A two-piece power piston is coupled for movement with the diaphragms and includes an output rod. An input member is adapted to be coupled to a movable brake pedal and is coupled to an air valve assembly. The input member moves the air valve assembly between open and closed positions to selectively admit atmospheric air into at least one of the chambers to induce an output force on the diaphragms which is transferred to the output rod of the power piston.

In accordance with the invention, the vacuum booster includes first, second and third chambers in which the first and second chambers are of comparable size and design with respect to known tandem boosters. The third chamber similarly sized with respect to the first and second chambers or may have a reduced size booster for applications where additional boost is required over a comparable tandem booster, but packaging limitations dictate a reduced size third chamber. Advantageously, the assembly of the triple booster utilizes a number of identical components for the multiple chambers thereby minimizing inventory complexities. Moreover, the installation of the diaphragms entails a retaining ring or similar member to both seal the diaphragm to the power piston and secure the multi-component power piston assembly together.

Testing of the triple booster according to this invention has shown that input/output force plots are substantially identical with respect to tandem booster designs with the exception of an increase in overall output force on the order of about 45%. This offers a significant benefit in braking force without the need for new calibration and tuning procedures typically required for new booster designs.

BRIEF DESCRIPTION OF THE DRAWINGS

Various objectives, advantages and features of the invention will become more readily apparent to those of ordinary skill in the art upon review of the following detailed description of the preferred embodiment taken in conjunction with the accompanying drawings.

DETAILED DESCRIPTION OF THE PREFERRED EMBODIMENT

Figure 1:
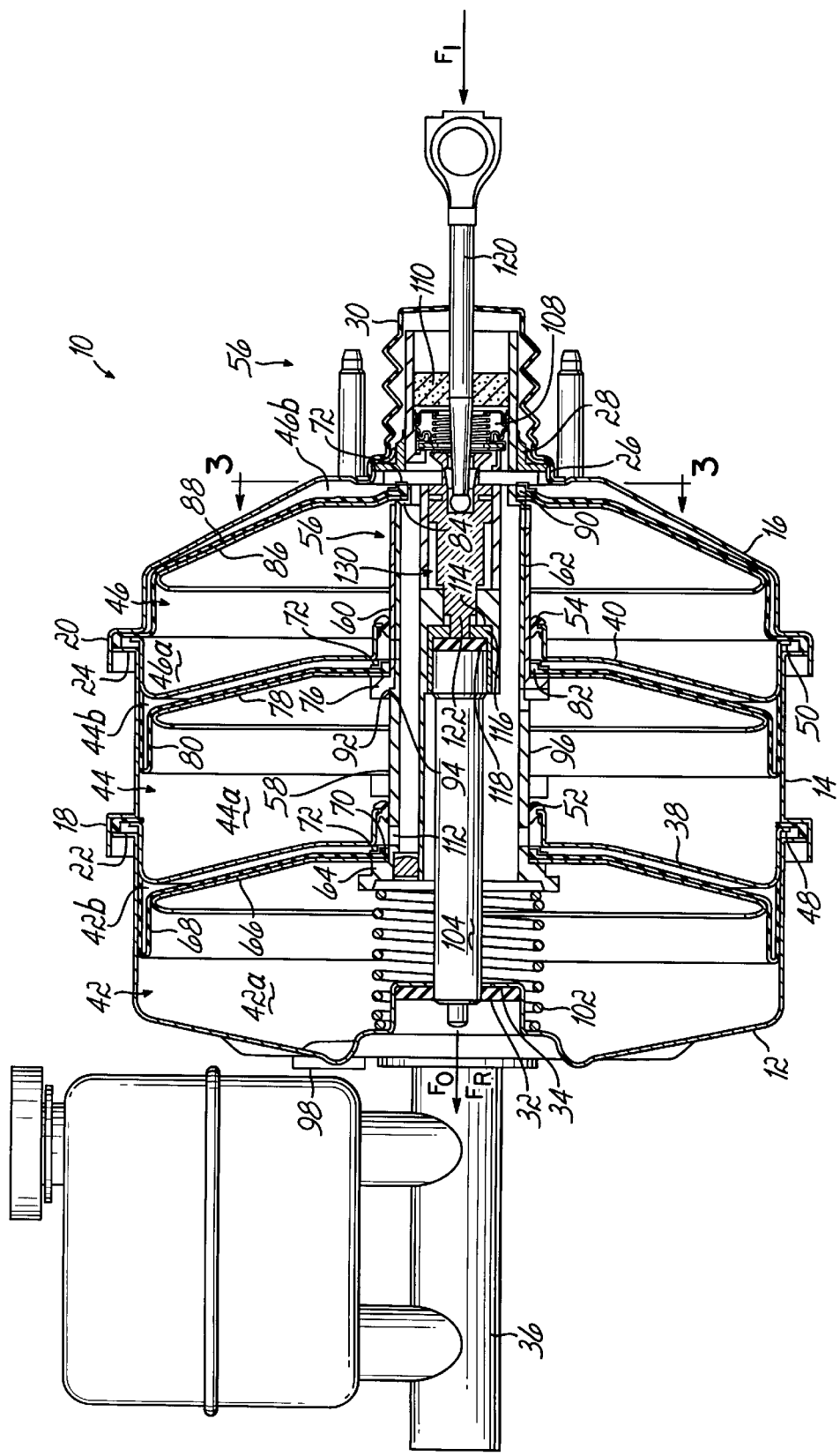
FIG. 1 is fragmentary cross sectional view of a power booster constructed in accordance with one embodiment of the invention and shown with no applied input force.

Referring initially to FIG. 1, a power booster 10 is shown as a triple diaphragm vacuum operated booster in this exemplary embodiment utilizing vacuum and atmospheric pressure differentials to boost input forces $F_I$, generating intensified output forces $F_O$. However, the present invention is also applicable to systems with a higher order diaphragm vacuum booster and with power boosters operating with other power sources. Power booster 10 has a substantially open internal cavity which is formed by a mating front housing 12, an intermediate housing 14 and a rear housing 16. The housings 12, 14, 16 are formed from a substantially rigid conventional material such as metal or plastic. Intermediate and rear housings 14, 16 each include an axially extending flange 18, 20 respectively. Axially extending flanges 18, 20 mate with outer turned flange 22, 24 of front and intermediate housing 12, 14, respectively, locking the housings 12, 14, 16 together. An inner edge 26 of rear housing 16 carries a seal 28. The end of rear housing 16 is enclosed by boot 30 which is received over the inner edge 26. Another seal 32 seals the area at an inner edge 34 of front housing 12. The seal 32 is secured between the rearward end of an associated master cylinder 36 of the type well known in the art and the front housing 12.

Housing dividers 38, 40 separate the internal cavity into front, intermediate and rear chambers 42, 44 and 46, respectively. Housing dividers 38, 40 each include an outer peripheral flange 48, 50 which is engaged between the associated and adjacent housings 12, 14, 16. Housing dividers 38, 40 also each include an inner edge which carries an annular seal 52, 54, respectively. A power piston assembly 56 extends through annular seals 28, 52, 54. The power piston assembly 56 is slidable forwardly and rearwardly within the annular seals 28, 52, 54 with the annular seals 28, 52, 54 acting as bearings for supporting the power piston assembly 56 in the lateral direction.

Power piston assembly 56 includes first and second power piston members 58, 60 that are concentrically mounted one upon another with the second power piston member 60 mounted around a reduced diameter portion 62 of the first power piston member 58. The first power piston member 58 extends across the rear and intermediate chambers 46, 44 and into the front chamber 42.

Figure 3:
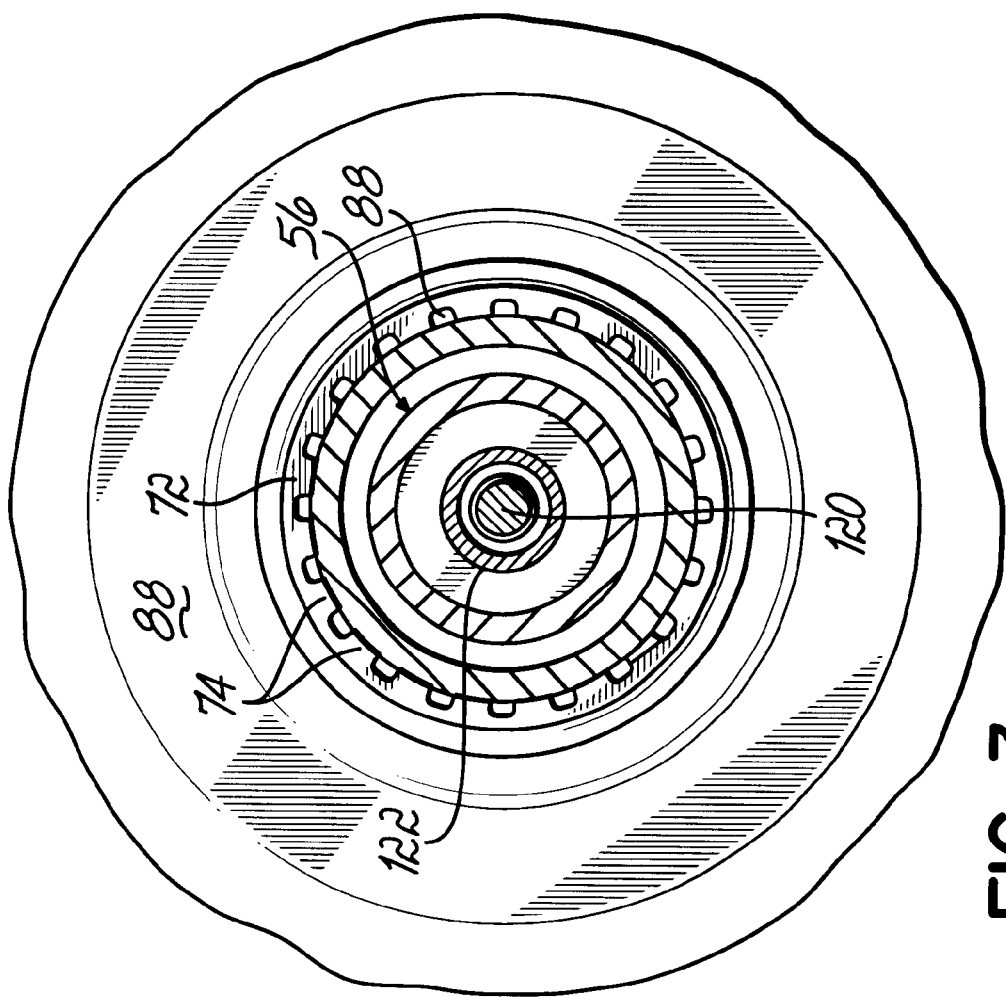
FIG. 3 is a cross-sectional view taken along line 3—3 of FIG. 1 showing a retaining ring according to one embodiment of this invention.

Power piston assembly 56 includes a rearwardly directed annular abutment flange 64 on the first member 58 against which support plate 66 supports diaphragm 68. Diaphragm 68 includes an integral inner annular seal 70 that engages the first member 58 of the power piston assembly 56. Diaphragm 68 separates front chamber 42 into a constant pressure control volume 42a and a variable pressure control volume 42b. The inner circumference of the diaphragm 68 is secured in sealing engagement to the power piston assembly 56 to form the seal 70 by a retaining member 72 (FIG. 3). The retaining member 72 is pressed onto the power piston assembly 56 to capture the seal 70 and an inner portion of plate 66 against the abutment flange 64. The retaining member 72 in one embodiment is a ring with a number of spaced tabs 74 around the inner circumference that deflect and bend to bite into the power piston assembly 56 when the ring 72 is pressed onto it.

Power piston assembly 56 also includes a rearwardly directed abutment flange 76 on the second member 60 against which support plate 78 supports diaphragm 80. Diaphragm 80 includes an integral inner annular seal 82 formed once again by a retaining ring 72 that engages the power piston assembly 56. Diaphragm 80 separates intermediate chamber 44 into a constant pressure control volume 44a and a variable pressure control volume 44b.

Power piston assembly 56 also includes a rearwardly directed annular abutment flange 84 on a proximal end of first power piston member 58 against which support plate 86 supports diaphragm 88. Diaphragm 88 includes an integral inner annular seal 90 formed by a retaining ring 72 that engages the power piston assembly 56 (FIG. 3). Diaphragm 88 separates rear chamber 46 into control volume 46a and control volume 46b.

The first and second power piston members 58, 60 are concentrically mounted together. The first member 58 includes a step 92 on its outer surface to mate with an annular notch 94 on the distal end of the second member 60. As a result of the step 92, the first member 58 has a larger diameter portion 96 and the smaller diameter portion 62. The step 92 and notch 94 engage each other and in combination with the associated retaining ring 72 of the intermediate chamber 44, the first and second power piston members 58, 60 are fixed together and prevented from translating relative to each other.

The diaphragms 68, 80, 88 and their respective support plates 66, 78, 86, are operable such that a vacuum pressure exists in control volumes 42a, 44a, 46a. This vacuum pressure is generated therein through a vacuum check valve 98. A variable pressure exists in control volumes 42b, 44b, 46b for selectively moving power piston assembly 56 forward in response to pressure differentials created by the introduction of atmospheric air through an air valve assembly 130. The variable pressure in control volumes 42b, 44b, 46b selectively creates a force on the respective diaphragms 68, 80, 88. The support plates 66, 78, 86 apply the force of the diaphragms to the respective rearwardly directed abutment flanges 64, 76, 84 of power piston assembly 56. In response, power piston assembly 56 compresses a return spring 102, causing power piston assembly 56 to slide within annular seals 28, 52, 54 forcing output support body 104 to apply force to the associated master cylinder 36. The variable pressure in control volumes 42b, 44b, 46b is increased through operation of the air valve assembly 130.

Figure 2:
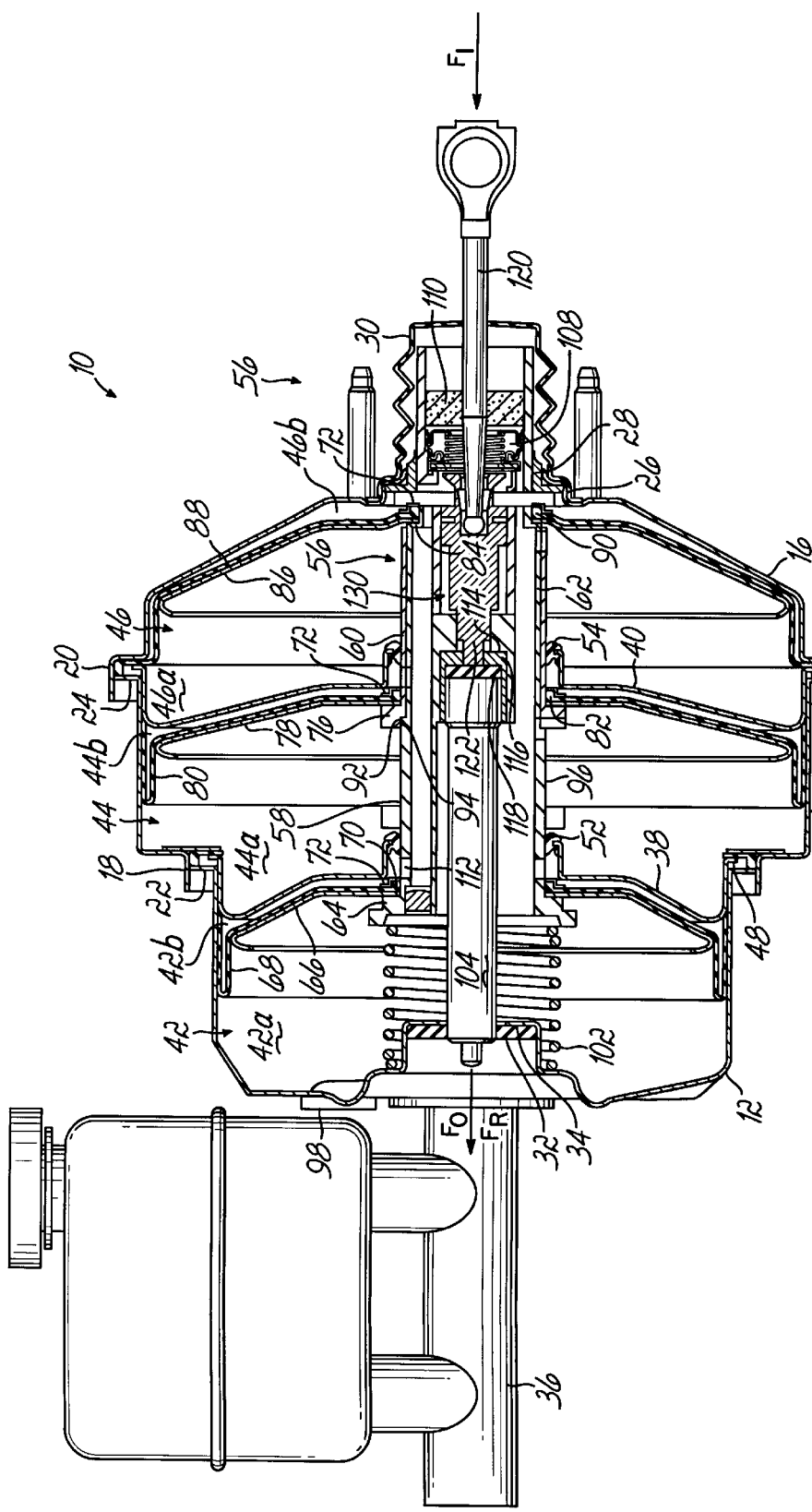
FIG. 2 is a view similar to FIG. 1 but of an alternative embodiment of the invention.

Referring to FIG. 2, an alternate embodiment of a triple power booster 10 according to this invention is shown in which the front chamber 43 has a reduced diameter compared to the intermediate and rear chambers 44, 46. This embodiment is particularly useful when additional boost is required over a tandem booster, but packaging limitations prevent the use of the triple booster of FIG. 1. Components which are similar between the embodiments of FIGS. 1 and 2 and similarly numbered.

In FIGS. 1 and 2, air valve assembly 130 is illustrated in the closed position against its mating component floating control valve 108. When opened, air valve assembly 130 allows atmospheric pressure to enter the control volumes 42b, 44b, 46b and thus creates a pressure differential across the diaphragms 68, 80, 88. The maximum pressure differential between constant pressure control volumes 42a, 42a, 46a on one hand and variable pressure control volumes 42b, 44b, 46b on the other hand, is the difference between generated vacuum and atmospheric. Typically, the vacuum pressure is generated by an internal combustion engine or by another form of air pump.

Referring to FIGS. 1 and 2, atmospheric air entering the power booster 10 travels through a filter 110 and the vacuum drawn from the power booster 10 exits through vacuum check valve 98 which is received in the front housing 12. Power piston assembly 56 includes a plurality of air passages 112 through which flow is directed in a conventional manner. When the pressure in control volumes 42b, 44b, 46b reaches atmospheric, no further additional pressure differential increase is possible. The power piston assembly 56 transmits power assisted force from the annular wall 114 through the annular reaction body 116 and the reaction disc 118 to a rod assembly designated as output support body 104 and therethrough, to the master cylinder 36. The output force $F_O$ is applied to the master cylinder 36 by the output support body 104, which is of a two piece construction in the present embodiment, but can also be formed as one piece. The output force$_{OF}$ results in an equal and opposite opposing force designated as total reaction force $F_R$ that is applied to the output support body 104. The total reaction force $F_R$ is apportioned by the reaction mechanism of the power booster 10 through a pushrod 120, which is transmitted to the driver's foot on the brake pedal.

When the brakes are applied, feedback in the form of a counteracting total reaction force $F_R$ from the master cylinder 36, is applied to the output support body 104 and therethrough to the reaction disc 118. The resiliency of the reaction disc 118 permits deformation thereof into the annular reaction body 116 so that engagement is established with the extension of reaction piston rod 122. This total reaction force $F_R$ is transmitted back through the reaction disc 118 to the annular reaction body 116 in the known manner. The reaction disc 118 biases the reaction piston rod 122 rearwardly providing a feedback force through piston rod 122 ultimately to the brake pedal (not illustrated) coupled with pushrod 120.

The design of the triple booster 10 of this invention offers significant advantages over other triple booster designs while still providing a substantial increase in power. The respective diaphragms 68, 80 support plates 66, 78 and retaining rings 72, 72 of the front and intermediate chambers 42, 44 of FIG. 1 are identical components thereby minimizing the inventory requirements for unique components in the system. Moreover, the retaining member, particularly the retaining ring 72 for the intermediate chamber 44 serves the added function of securing the first and second power piston members 58, 60 together when installed.

While the present invention has been illustrated by a description of a preferred embodiment and while this embodiment has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

However, the invention itself should only be defined by the appended claims, wherein we claim:

1. A power booster for a brake system, the power booster comprising:
    a housing having an interior;
    a plurality of divider plates mounted inside the housing and dividing the interior into a front chamber, an intermediate chamber and a rear chamber;
    a power piston assembly disposed within the front, intermediate, and rear chambers;
    a front diaphragm, an intermediate diaphragm and a rear diaphragm each coupled to the power piston assembly, for dividing each of the front, intermediate and rear chambers into a constant pressure volume and a variable pressure volume;
    a front support plate, an intermediate support plate, and a rear support plate associated with the front, intermediate, and rear diaphragms, respectively, for transferring force from the diaphragms to the power piston assembly;
    a constant pressure passage providing communication between the constant pressure volumes formed in the front, intermediate and rear chambers;
    a variable pressure passage providing communication between the variable pressure volumes formed in the front, intermediate and rear chambers;
    an air valve assembly movable between open and closed positions to selectively admit atmospheric air into at least one of the chambers to induce an output force on the associated diaphragm that is transferred to the power piston assembly; and
    an input shaft operatively associated with a brake pedal to actuate the air valve assembly;
    wherein the power piston assembly further comprises a first and a second power piston member each of which is in sliding contact with one of the divider plates for movement in response to movement of the diaphragms; and
    wherein the first and second power piston members are concentrically mounted one upon another.

2. The power booster of claim 1 wherein the first and second concentrically mounted power piston members are in contact substantially along the entire length of the second power piston member.

3. The power booster of claim 1 wherein each of the power piston members further comprises an abutment flange engaged with one of the support plates to transmit the movement of the support plates in response to the associated diaphragm and deliver the output force.

4. The power booster of claim 3 wherein the first power piston member further comprises a plurality of the abutment flanges each of which engages one of the support plates.

5. The power booster of claim 4 wherein the abutment flanges of the first power piston member engage the support plates associated with the front and rear chambers and the abutment flange of the second power piston member engages the support plate associated with the intermediate chamber.

6. The power booster of claim 1 wherein the front, intermediate and rear chambers each have substantially the same outer diameter.

7. The power booster of claim 1 wherein the front chamber has a smaller outer diameter than the outer diameters of the intermediate and rear chambers.

8. The power booster of claim 1 further comprising:
    an output support body coupled to the power piston assembly to transmit the output force to a brake system master cylinder.

9. The power booster of claim 1 further comprising:
    a plurality of retention members each surrounding a portion of the power piston assembly and coupling a portion of one of the diaphragms to the power piston assembly.

10. The power booster of claim 9 wherein each retention member further comprises a retention ring seated onto the power piston assembly and sealing an inner circumference of the associated diaphragm to the power piston assembly.

11. The power booster of claim 9 wherein at least one of the retention members also secures the first power piston member to the second power piston member.

12. The power booster of claim 10 wherein each retention ring further comprises:
    a plurality of spaced tabs projecting from an inner circumference of the retention ring to engage the associated diaphragm and secure the diaphragm to the power piston assembly.

13. The power booster of claim 9 wherein a portion of the each diaphragm and a portion of the associated support plate are sandwiched between the associated retention member and a portion of the power piston assembly.

14. The power booster of claim 1 further comprising:
retention means for coupling a portion of each diaphragm to the power piston assembly.

15. The power booster of claim 14 wherein the retention means further comprises:
securing means for securing the first and second power piston members together.

16. A power booster for a brake system, the power booster comprising:
a housing having an interior;
a plurality of divider plates mounted inside the housing and dividing the interior into a front chamber, an intermediate chamber and a rear chamber;
a power piston assembly disposed within the front, intermediate, and rear chambers;
a front diaphragm, an intermediate diaphragm and a rear diaphragm each coupled to the power piston assembly and dividing the front, intermediate and rear chambers, respectively, into a forwardly located, constant pressure volume and a rearwardly located, variable pressure volume;
a front support plate, an intermediate support plate, and a rear support plate associated with the front, intermediate, and rear diaphragms, respectively, for transferring force from the diaphragms to the power piston assembly;
a constant pressure passage providing communication between the constant pressure volumes formed in the front, intermediate and rear chambers;
a variable pressure passage providing communication between the variable pressure volumes formed in the front, intermediate and rear chambers;
an air valve assembly movable between open and closed positions to selectively admit atmospheric air into at least one of the chambers to induce an output force on the associated diaphragm that is transferred to the power piston assembly;
an input shaft operatively associated with a brake pedal to be driven in a reciprocating manner to actuate the air valve assembly;
wherein the power piston assembly further comprises a first and a second power piston member each of which is in sliding contact with to one of the divider plates for movement in response to movement of the diaphragms;
wherein the first and second power piston members are concentrically mounted one upon another;
an abutment flange on each of the power piston members engaged with one of the support plates to transmit the movement of the support plates in response to the associated diaphragm; and
a plurality of retention rings each surrounding a portion of the power piston assembly and sealing an inner circumference of the associated diaphragm to the power piston assembly.

17. The power booster of claim 16 wherein at least one of the retention rings also secures the first power piston member to the second power piston member.

18. The power booster of claim 16 wherein each retention ring further comprises:
a plurality of spaced tabs projecting from an inner circumference of the retention ring to engage the associated diaphragm and secure the diaphragm to the power piston assembly.

19. The power booster of claim 16 wherein a portion of the each diaphragm and a portion of the associated support plate are sandwiched between the associated retention ring and a portion of the power piston assembly.

* * * * *